Nov. 29, 1966 — T. F. RISTAU — 3,288,239
ADJUSTABLE TOEBOARD AND CONTROL PEDAL FOR VEHICLES

Filed May 25, 1964 — 2 Sheets-Sheet 1

INVENTOR.
Theodore F. Ristau
BY
W. S. Pettigrew
ATTORNEY

Nov. 29, 1966  T. F. RISTAU  3,288,239
ADJUSTABLE TOEBOARD AND CONTROL
PEDAL FOR VEHICLES
Filed May 25, 1964  2 Sheets-Sheet 2
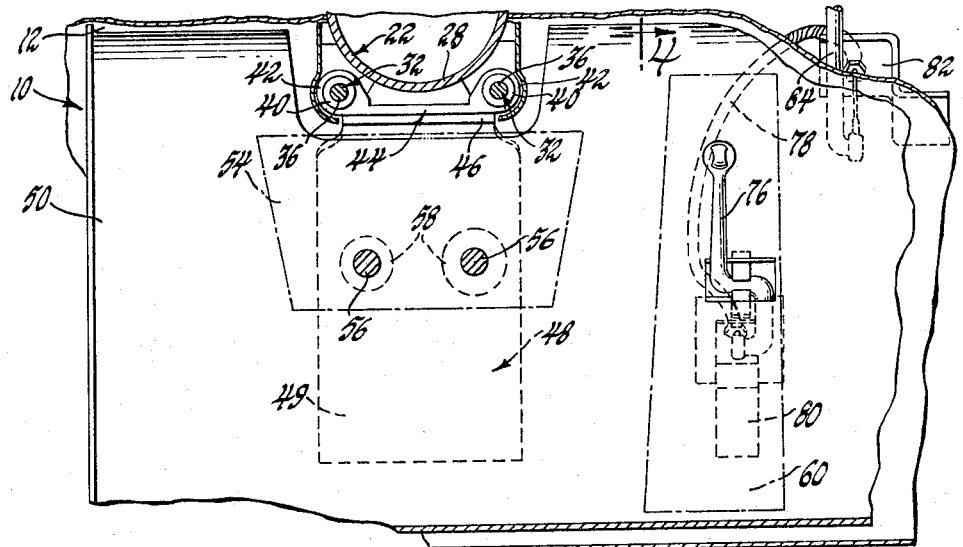
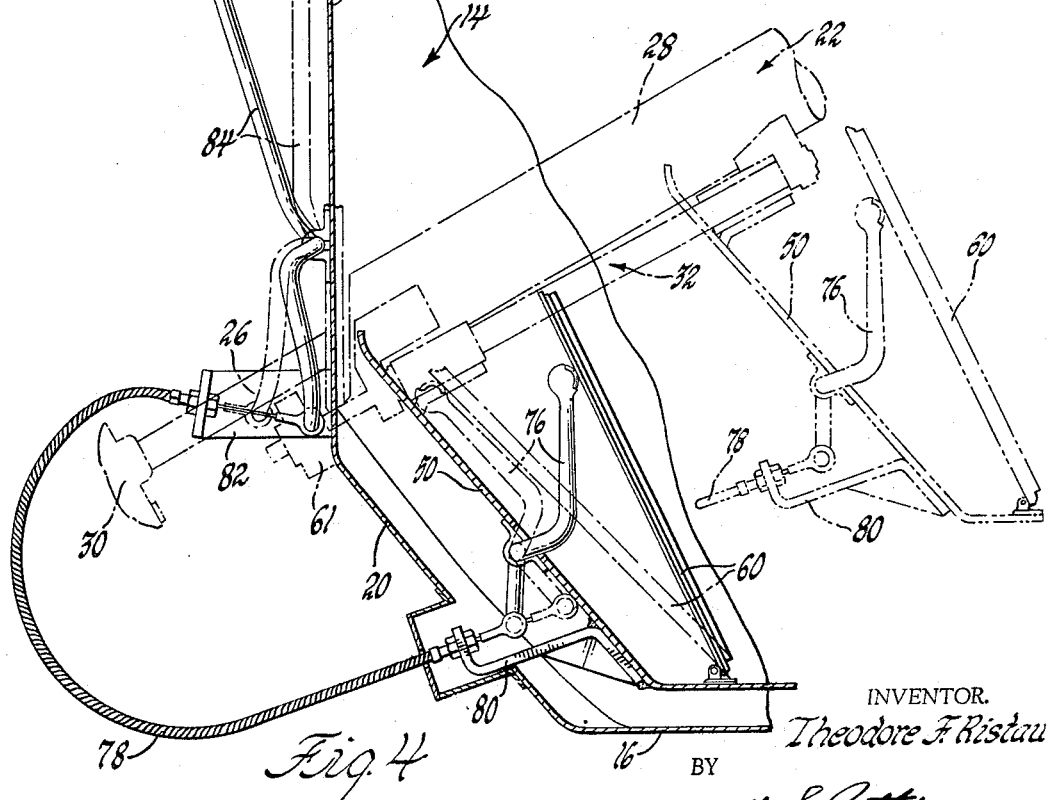
INVENTOR.
Theodore F. Ristau
BY
W.S. Pettigrew
ATTORNEY US United States Patent Office

3,288,239
Patented Nov. 29, 1966

3,288,239
ADJUSTABLE TOEBOARD AND CONTROL PEDAL FOR VEHICLES
Theodore F. Ristau, Saginaw, Mich., assignor to General Motors Corporation, Detroit, Mich., a corporation of Delaware
Filed May 25, 1964, Ser. No. 369,818
4 Claims. (Cl. 180—78)

This invention relates to vehicle control pedals and more particularly to an adjustable vehicle control pedal arrangement.

One feature of this invention is that it provides a new and improved vehicle control pedal arrangement wherein the pedals are adjustable relative to the vehicle body. Another feature of this invention is that it provides a new and improved vehicle control pedal arrangement wherein the pedals are mounted on a toeboard which is adjustable relative to the vehicle body to various selected positions of the toeboard and the pedals. A further feature of this invention is that the toeboard and pedals are adjustably mounted on a vehicle steering column which extends into a predetermined convenient relationship with an adjacent passenger seat, the toeboard and pedals being adjustable along the steering column to various selected positions thereof within a path defined by the steering column and thus conforming to the convenient relationship thereof with the seat.

These and other features and advantages of the invention will be readily apparent from the following specification and drawings wherein:

FIGURE 3 is a partial sectional view taken generally along the plane indicated by line 3—3 of FIGURE 2; and FIGURE 4 is a sectional view taken generally along the plane indicated by line 4—4 of FIGURE 3.

Figure 1:
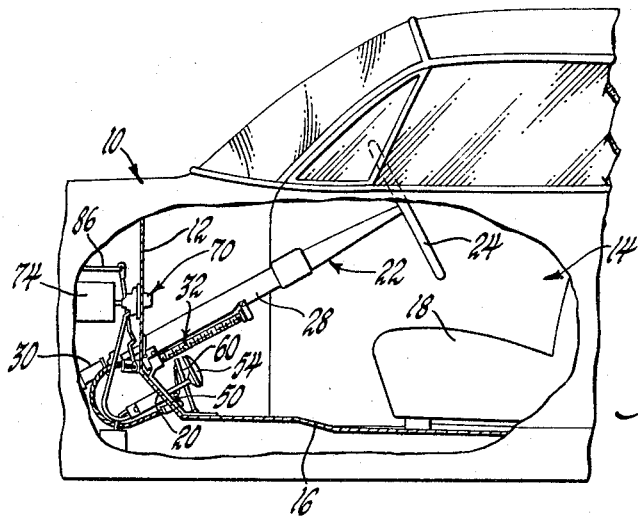
FIGURE 1 is a fragmentary partially broken away elevational view of a vehicle body including an adjustable vehicle control pedal arrangement according to this invention.

Referring now particularly to FIGURE 1 of the drawings, a vehicle body 10 includes a dash panel 12 separating the forward engine compartment of the vehicle from the passenger compartment 14, a floor pan 16 fixedly mounting a passenger seat 18, and a toepan 20 joining dash panel 12 and floor pan 16. A steering column 22 bearing at its upper end a steering wheel 24 extends rearwardly and upwardly within passenger compartment 14 from its mounting on dash panel 12 and into a predetermined convenient relationship with seat 18.

Figure 2:
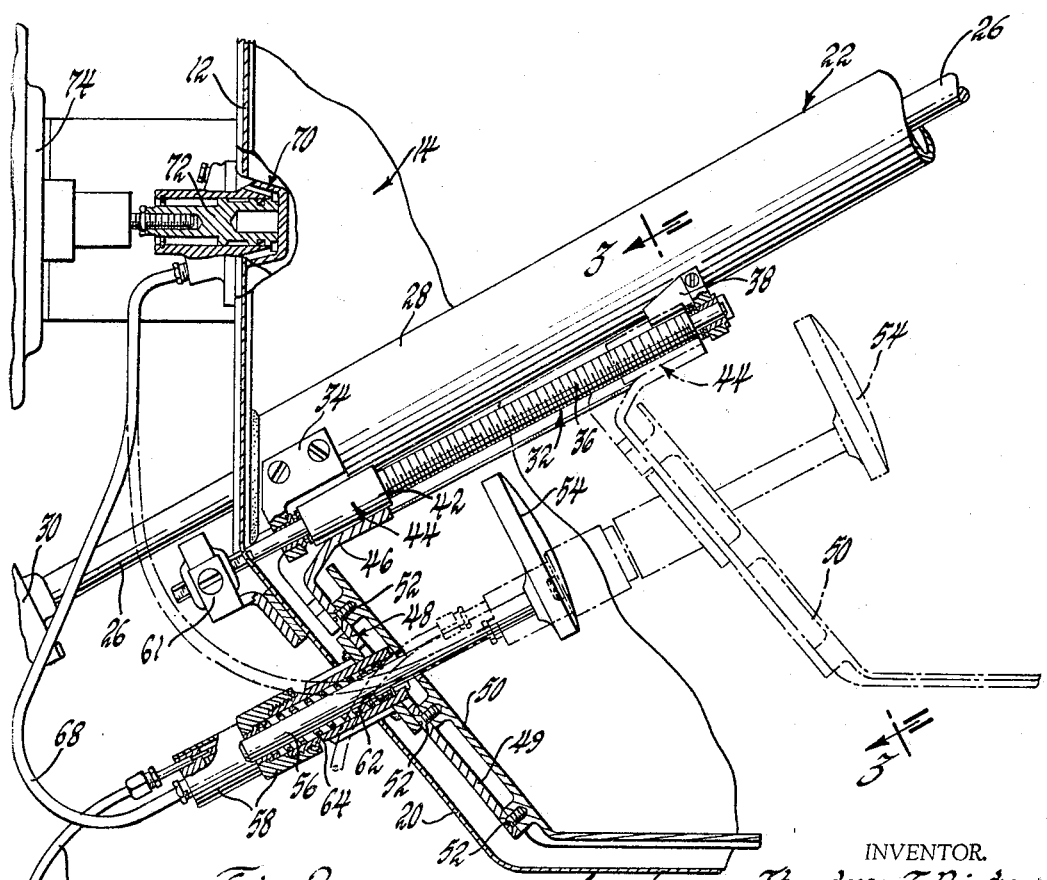
FIGURE 2 is an enlarged broken away view of a portion of FIGURE 1.

Referring now to FIGURE 2, column 22 includes a steering shaft 26 rotatably supported within a mast jacket 28 and connecting steering wheel 24 with the vehicle steering gear 30. A pair of laterally spaced screw and nut actuators 32, FIGURE 3, are each mounted on mast jacket 28 by a forward mounting bracket 34, FIGURE 2, journaling the forward end of each screw 36, and a rearward mounting bracket 38 journaling the rearward end of each screw. The nuts 40 of actuators 32, threadedly engaged with respective screws 36, are secured within laterally spaced cylindrical housing portions 42 of a carrier member 44, member 44 thus being mounted by the actuators for translation in both forward and rearward directions along mast jacket 28 upon selected rotation of screws 36.

Welded or otherwise suitably secured to member 44 is an upper leg 46 of a generally L-shaped mounting member 48, the lower leg 49 of which has mounted thereto by screws 52, a toeboard 50 of a configuration complementary to the contour defined by the joined toepan 20 and floor pan 16. Associated with toeboard 50 are a pair of vehicle control pedals, specifically, a brake pedal 54 secured to a pair of shafts 56, FIGURE 3, reciprocably mounted in a pair of cylinders 58, FIGURE 2, welded at their rearward ends to the lower leg 49 of member 48, and an accelerator pedal 60 hingedly mounted adjacent its lower end on the toeboard 50.

It will be apparent that toeboard 50 and control pedals 54 and 60 are adjustable both forwardly and rearwardly along mast jacket 28 upon selected operation of actuators 32, this movement, as seen in FIGURE 2, being limited between a most forward position, as shown in full lines, and an elevated most rearward position, as shown in broken lines. It will further be apparent that the path of adjustment thus defined is that path which is usually greatly desired in seating arrangements such as that shown in that, for persons of shorter stature, the toeboard and pedals not only adjust rearwardly, but also upwardly, to afford greatest relaxation of an operator's legs. In the present invention, this is achieved by taking advantage of the normal predetermined angularity relative to horizontal with which steering column 22 extends from the area of steering gear 30 into convenient relationship with seat 18.

As is well-known, the actuators 32 of the type shown are immediately adaptable for operation in either direction by many known means, preferably, for the low speeds desired here, by reversible electric motor means connected to the screws 36 through worm and worm gear reduction units 61, FIGURE 2, on the lower ends of the screws.

Referring now to FIGURES 2 and 3, the lefthand shaft 56 of pedal 54 carries a shouldered bushing 62 seating one end of a compression spring 64 seated at its other end on a bushing at the lower end of cylinder 58. The righthand shaft 56 of pedal 54 is suitably adapted to serve as a piston operable upon depression of pedal 54 against the action of spring 64 to draw fluid from a reservoir, not shown, through tubing 66, and to force the fluid under high pressure through tubing 68 to a hydraulic servo 70 including a piston 72 operable upon a power brake mechanism 74. As shown in FIGURE 4, pedal 60 operates a control lever 76 pivoted intermediate its ends on toeboard 50 and connected to one end of a flexible spiral sheathed cable 78 supported by brackets 80 and 82 on the toeboard and dash panel 12 respectively. At its other end, cable 78 connects through a pivotable lever 84 with the vehicle throttle control linkage indicated at 86. It will be apparent that by virtue of the flexible tubing 66 and 68, and the flexible cable 78, the described adjustment of toeboard 50 and pedals 54 and 60 may occur without restriction from the mechanisms operated by the pedals.

Although as described, pedal 54 is assembled on member 48 to act as a piston device for actuating the servo 70, it will be understood that pedal 54 may immediately adapt to operate a master cylinder for conventional hydraulic brake control apparatus, the master cylinder being assembled as a unit with the pedal on member 48, or otherwise.

Although forming no part of the present invention, steering column 22 may include provision for adjustment of the steering wheel 24 relative to seat 18, thus to provide complete positional adjustability of the various vehicle controls to suit the needs of an individual operator.

Thus a new and improved adjustable vehicle control pedal arrangement is provided.

I claim:
1. In a vehicle body including a passenger seat, the combination comprising, a steering column mounted on the body in predetermined relation with the seat, a pedal mounting member, a control pedal movably mounted on said pedal mounting member, motion guiding means defining a rectilinear path, means mounting said motion guiding means on said steering column to have the motion path thereof directed therealong, means mounting said pedal mounting member on said motion guiding means for rectilinear movement along said steering column, and means for moving said pedal mounting member along said steering column to various selected positions of said pedal relative to said seat.

2. The combination recited in claim 1 wherein said pedal mounting member is a toeboard having portions providing a rest surface for the vehicle operator's feet.

3. The combination recited in claim 1 further including a vehicle control mechanism mounted on said pedal mounting member for movement therewith and responsive to movement of said pedal relative to said pedal mounting member to control the vehicle.

4. The combination recited in claim 1 wherein said motion guiding means includes a screw and nut actuator, the screw portion thereof being rotatably mounted on said steering column, said pedal mounting member being mounted on the nut portion of said actuator.

References Cited by the Examiner
UNITED STATES PATENTS

| | | | |
|---|---|---|---|
| 1,929,409 | 10/1933 | Carr | 180—77 |
| 2,152,543 | 3/1939 | Feilcke | 180—77 X |
| 2,620,042 | 12/1952 | Vincent | 180—77 |
| 2,860,720 | 11/1958 | Huff et al. | 180—90.6 |

A. HARRY LEVY, *Primary Examiner.*

BENJAMIN HERSH, *Examiner.*

E. E. PORTER, *Assistant Examiner.*